United States Patent
Haimer

(10) Patent No.: US 11,141,797 B2
(45) Date of Patent: Oct. 12, 2021

(54) COOLING DEVICE FOR COOLING A SHRINK-FIT CHUCK

(71) Applicant: Franz Haimer Maschinenbau KG, Igenhausen (DE)

(72) Inventor: Franz Haimer, Igenhausen (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 311 days.

(21) Appl. No.: 16/058,036

(22) Filed: Aug. 8, 2018

(65) Prior Publication Data

US 2019/0054546 A1 Feb. 21, 2019

(30) Foreign Application Priority Data

Aug. 16, 2017 (DE) ...................... 10 2017 118 643.3

(51) Int. Cl.
*B23P 11/02* (2006.01)
*B23B 31/117* (2006.01)

(52) U.S. Cl.
CPC ......... *B23B 31/1179* (2013.01); *B23P 11/027* (2013.01)

(58) Field of Classification Search
CPC ..... B23B 3/117; B23B 3/1179; B23B 31/117; B23B 31/1179; F01N 1/24; F01N 13/14; F01N 13/16; B23P 11/027; B23P 11/02; B23P 11/025; B23P 11/022; H05B 6/10; H05B 6/14; H05B 6/101; H05B 6/40; H05B 6/42

See application file for complete search history.

(56) References Cited

U.S. PATENT DOCUMENTS

| | | | |
|---|---|---|---|
| 3,605,797 A * | 9/1971 | Dieckmann et al. | F24F 13/0263 137/375 |
| 6,148,782 A * | 11/2000 | Fuesser | F02M 35/1222 123/184.53 |
| 6,857,502 B2 * | 2/2005 | Naito | F01N 1/24 181/222 |
| 9,636,788 B2 | 5/2017 | Haimer | |
| 2005/0084956 A1 * | 4/2005 | Tamaoki | C12M 41/14 435/303.1 |
| 2006/0021208 A1 * | 2/2006 | Pfau | B23Q 17/0923 29/447 |
| 2014/0367929 A1 * | 12/2014 | Fahrion | B23B 31/20 279/42 |
| 2015/0000121 A1 * | 1/2015 | Haimer | B23P 11/027 29/800 |

(Continued)

FOREIGN PATENT DOCUMENTS

DE 102012002596 A1 8/2013
GB 494719 A * 10/1938 ............... F01N 1/10

*Primary Examiner* — Harry E Arant
(74) *Attorney, Agent, or Firm* — Paul D. Bianco; Katharine Davis; Fleit Intellectual Property Law

(57) ABSTRACT

A device for cooling a shrink-fit chuck with a cooling head, which contains a cooling attachment that can be mounted on the shrink-fit chuck and an intake tube connected to the cooling attachment for the drawing of air at an input of a passage opening in the cooling attachment. In order to make possible a limited noise emission, the cooling head includes a cooling air feed at least partially insulated by a sound insulation device to supply air to the input of the passage opening on the cooling attachment.

19 Claims, 4 Drawing Sheets

(56) References Cited

U.S. PATENT DOCUMENTS

2015/0296659 A1\* 10/2015 Desiano ............ H05K 7/20263
　　　　　　　　　　　　　　　　　　　　　　361/701

\* cited by examiner

COOLING DEVICE FOR COOLING A SHRINK-FIT CHUCK

FIELD OF THE INVENTION

The invention concerns a device for cooling a shrink-fit chuck.

BACKGROUND

This type of device is known from DE 10 2012 002 596 A1. The cooling device disclosed therein contains a cooling head with a cooling attachment that can be mounted on a shrink-fit chuck and an intake tube connected to the cooling attachment, via which air can be drawn in at an input of a passage opening arranged in the cooling head. The cooling head for cooling in this device is not completely mounted on the shrink-fit chuck and the air used for cooling is drawn in via a gap between a lower end surface of the cooling head and the shrink-fit chuck. The drawn-in air spreads out upward on its path over the clamping area of the shrink-fit chuck and cools it. The cooling effect is intensified in that a liquid coolant is added to the air stream. The amount of additionally supplied liquid coolant is established, so that the liquid coolant is fully entrained by the air stream and no liquid reaches the bottom of the cooling head. Particularly effective cooling can thereby be achieved even without costly collecting devices. However, depending on the shrink-fit chuck, a different gap between the cooling attachment and the shrink-fit chuck can result from the air feed chosen here, which can lead to undesirable flow noises and high noise development under unfavorable conditions.

SUMMARY

One aspect of the disclosure relates to a device for cooling a shrink-fit chuck that also permits effective cooling with limited noise emission.

Practical refinements and advantageous embodiments are also disclosed.

In an embodiment, the cooling head in the device according to the invention has a cooling air feed at least partially insulated by a sound insulation device to supply air to the input of the passage opening on the cooling attachment. This provides the user with advantages, since no additional noise protection measures need be taken. This facilitates use of the device in everyday practice. The air for cooling can be drawn in via a defined intake independently of the type of shrink-fit chuck and guided via a type of "sound damper" to the input of the cooling attachment that can be mounted on the shrink-fit chuck. The air is no longer drawn in on the shrink-fit chuck but on a suction part provided with a defined opening. The suction opening therefore always has the same shape regardless of the geometry of the shrink-fit chuck.

The cooling attachment and the intake tube are expediently enclosed by a housing and the cooling air feed has a feed line arranged between the housing and the intake tube, as well as an additional feed line connected to the first feed line arranged between the housing and the cooling attachment.

In a preferred embodiment, the sound damping device contains a grid tube concentrically arranged around the intake tube within the housing, in which the feed line arranged between the housing and the intake tube runs. The grid tube forms a type of silencer through which the noise of the air flowing through this feed line can be insulated from the outside. The grid tube can be secured in the housing spaced apart from the intake tube by an upper and lower spacer and is preferably enclosed by an insulating element made of glass wool or another insulating material arranged between the grid tube and the housing.

In another advantageous embodiment, an inwardly protruding radial collar and/or sealing element with an inward protruding sealing lip can be provided opposite the round input of the passage opening on the cooling attachment on an opening in the housing spaced apart from the end surface of the cooling attachment. Through the radial collar, the air flowing through the additional feed line between the cooling attachment and the lower housing part can be directed upwards to the input of the passage opening on the cooling attachment. A gap between the opening and the shrink-fit chuck can be sealed by the sealing element and the undesired suction of air through this gap can be prevented.

In order to achieve particularly effective and rapid cooling, a device for supplying a coolant to the passage opening can be arranged on the cooling attachment. A coolant can be supplied via this device into the gap between the cooling attachment and the outside of the part of the shrink-fit chuck being cooled. The amount of supplied coolant is metered, so that the entire coolant is entrained via the air stream. No costly collecting devices for the coolant are therefore necessary beneath the shrink-fit chuck.

The device for supplying the coolant expediently has a feed line arranged in the cooling attachment and feed holes that discharge into passage opening and branch off from the feed line. The feed holes can run obliquely downward in the direction of the bottom of the cooling attachment, so that the coolant encounters the air stream obliquely from above. The coolant can preferably consist of water. However, liquid $CO_2$, liquid nitrogen or other liquid or gaseous cooling media are also possible.

Blast air openings to supply blast air directly obliquely upwards can also be provided in the cooling attachment. Any cooling liquid remaining on the shrink-fit chuck can thereby be blown off.

In another expedient embodiment, an induction device can also be integrated in the cooling attachment. The cooling attachment can therefore be used not only for cooling, but also for inductive heating of the shrink-fit chuck and therefore for shrinking-in or shrinking-out of a tool.

BRIEF DESCRIPTION OF THE DRAWINGS

Additional details and advantages of the invention are apparent from the following description of a preferred embodiment example with reference to the drawings. In the drawings.

DETAILED DESCRIPTION

Figure 1:
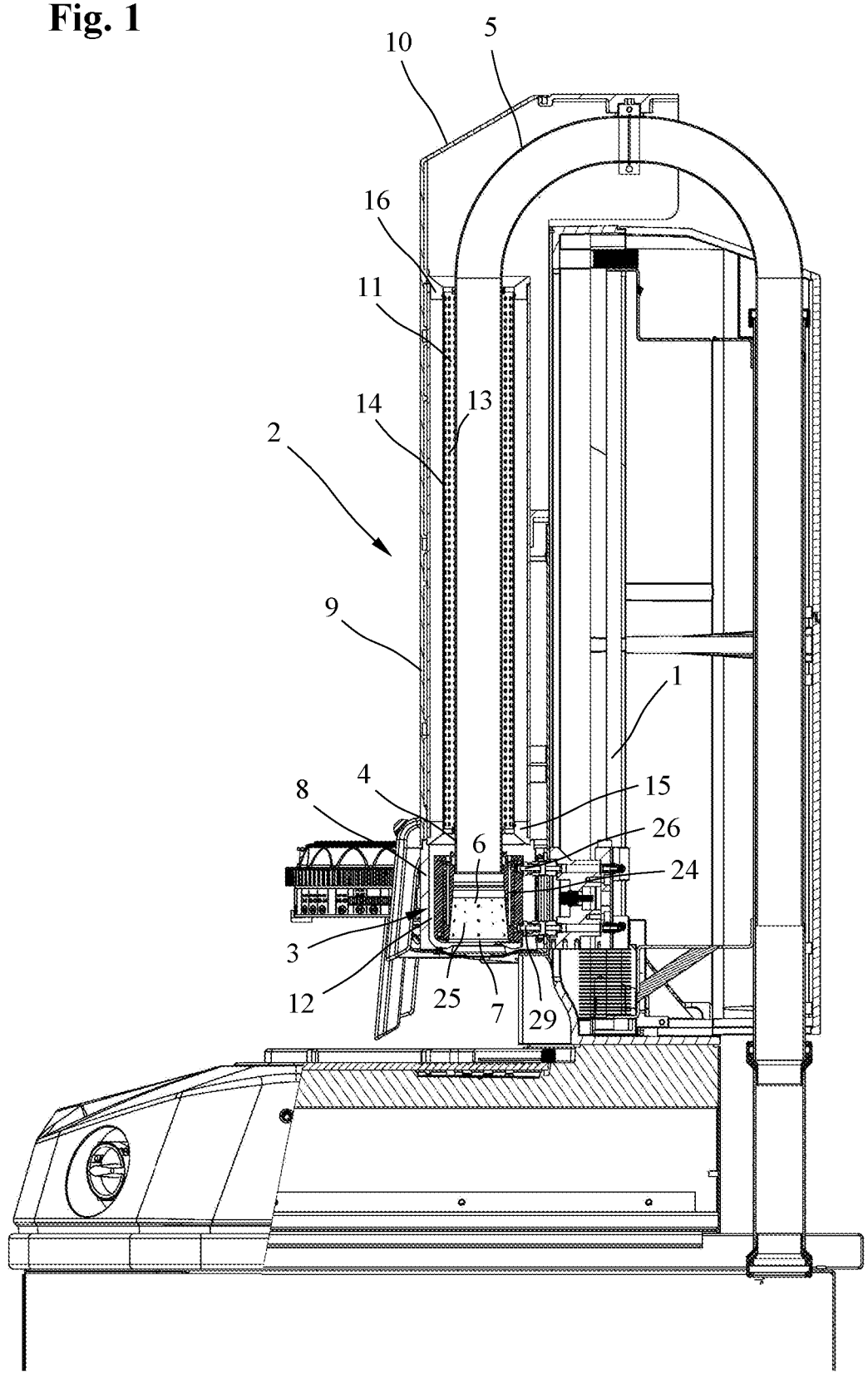
FIG. 1 shows a schematic depiction of a device for cooling a shrink-fit chuck in a partially cutaway side view.

The device for cooling of a shrink-fit chuck depicted only partly in FIG. 1 contains a cooling head 2 guided to move on a frame or stand 1, which contains a cooling attachment 3 that can be mounted at least on the part of the shrink-fit chuck to be cooled and an intake tube 4 connected to the cooling attachment 3. The intake tube 4 is connected to a suction unit, not shown here, via an intake line 5 designed as a hose or stable tube. The cooling attachment 3, to be further explained below, contains a passage opening 6, whose inside contour is adjusted to the outside contour of the part of the shrink-fit chuck being cooled such that, when the cooling attachment 3 is mounted on the shrink-fit chuck, a gap remains between the inside wall of the cooling attachment and the outside surface of the shrink-fit chuck. The inside contour of the passage opening 6 is then dimensioned, so that a large spectrum of shrink-fit chucks can be cooled, especially in terms of their diameter and length. Air can be drawn in at a lower input 7 of the passage opening 6 of the cooling attachment 3 via the intake line 5 connected to the suction unit, the intake tube 4 and the cooling attachment 3 and guided through the gap along the outside surface of the shrink-fit chuck for its cooling. The suction unit together with the intake line 5 and the intake tube 4 forms an intake device, via which cooling air is drawn into the cooling attachment 3 and can be guided along it for cooling of the shrink-fit chuck.

The cooling attachment 3 and the intake tube 4 are arranged within a housing, composed here of a lower housing part 8 and upper housing part 9. A suction part 10 open to the rear is arranged on the top of the upper housing part 9, through which the air is drawn in from the surroundings and can be guided via a cooling air feed arranged within the housing to the input 7 of the passage opening 6 of the cooling attachment 3.

As follows in particular from FIG. 2, the cooling air feed arranged within the housing has a feed line 11, which is angular in cross section and arranged between intake tube 4 and the upper housing part 9, and an additional feed line 12, which is angular in cross section and formed between the cooling attachment 3 and the lower housing part 8. The feed line 11 arranged between intake tube 4 and the upper housing part 9 runs in a grid tube 14 provided with radial passages 13, which is arranged concentrically with the intake tube 4 in the upper housing part 9. The grid tube 14 is secured in the upper housing part 9 spaced apart from the intake tube 4 by a lower and upper annular spacer 15 and 16. An insulating element 18 made of glass wool or another insulating material is arranged in an annular space 17 present between the grid tube 14 and the upper housing part 9.

Figure 3:
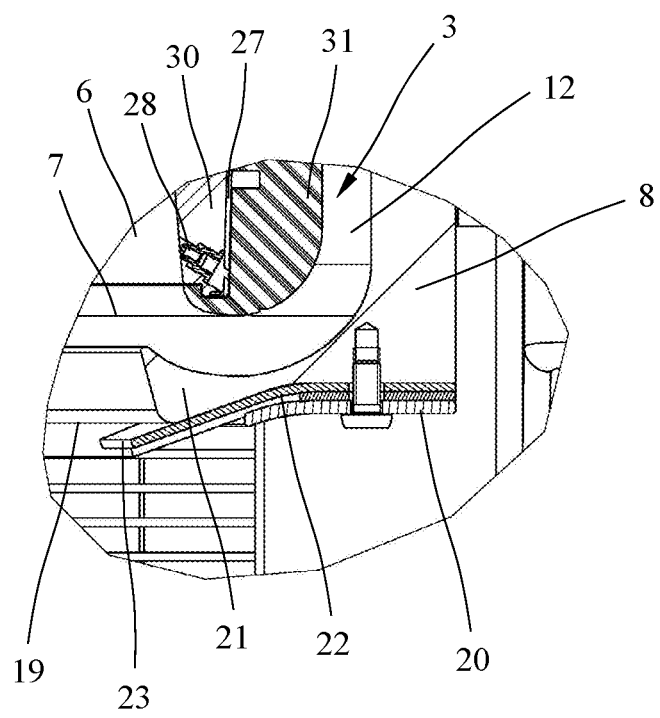
FIG. 3 shows a detail view of a cooling attachment.

As is also apparent from FIG. 3, the lower housing part 8 contains an inwardly protruding radial collar 21 at an opening 19 in its bottom 20 spaced apart from the end face of the cooling attachment 3 relative to the round input 7 of the passage opening 6 on the cooling attachment 3, via which the air flowing in the additional feed line 12 between the cooling attachment 3 and the lower housing part 8 is directed upwards to the input 7 of the passage opening 6 on the cooling attachment 3. A sealing element 22 with a flexible sealing lip 23 is fastened for contact against the shrink-fit chuck at the opening 19 in the bottom 20 of the lower housing part 8. A gap between the opening 19 and the shrink-fit chuck can thereby be sealed off and undesired suction of air through this gap can be prevented. The sealing lip 23 consists of a heat-resistant material, such as a fiberglass fabric.

To achieve particularly effective and rapid cooling, a device to supply a liquid or gaseous coolant to the passage opening 6 can be arranged on the cooling attachment 3. Water or another liquid or gaseous coolant can be sprayed into the gap between the cooling attachment 3 and the outside of the part of the shrink-fit chuck being cooled via this device. The amount of sprayed coolant is metered, so that the entire coolant is entrained by the air stream. This point is particularly significant. The outer surface of the part of the shrink-fit chuck being cooled should not be "drenched" but rather the coolant dissolved in the air stream should spread over the surface. No costly collecting devices for the coolant are therefore necessary beneath the shrink-fit chuck, especially in liquid coolants. In a particularly preferred embodiment a device not further shown here is connected on the suction tube in order to separate the employed coolant from the air stream again and supply it for reuse.

As follows from FIG. 1, the device for supplying a coolant in the depicted embodiment example has a feed line 24 arranged in the cooling attachment 3 and feed holes 25 discharging into the passage opening 6, branching off from the feed line 24. The feed holes 25 are aligned obliquely downwards in the direction of input 7 of the passage opening 6 on the bottom of the cooling attachment 3, so that the liquid coolant encounters the air stream obliquely from above. Liquid coolant can be directed via connection 26 and a pump (not shown) into the feed line 24 and from there via the feed hole 25 to the passage opening 6 of the cooling attachment 3.

Figure 2:
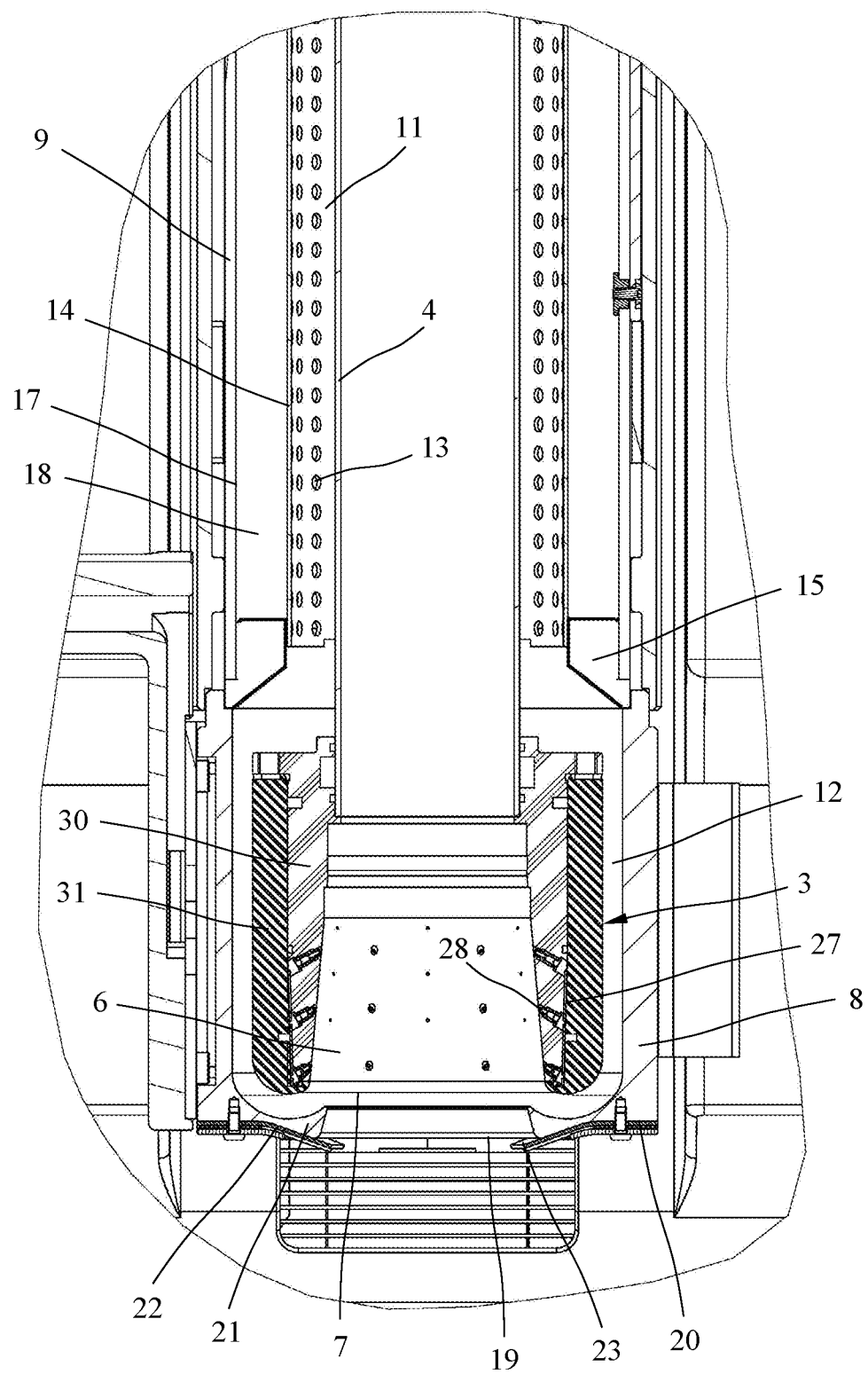
FIG. 2 shows a detail view of the device depicted in FIG. 1.

A feed line 27, which can be seen in FIG. 2, with blast air openings 28 preferably directed obliquely upwardly to supply blast air is also provided in the cooling attachment 3. Any cooling liquid remaining on the shrink-fit chuck can be blown off thereby. A connection 29 depicted in FIG. 1 for supply blast air is arranged on the cooling attachment 3.

For simpler production, the cooling attachment 3 can be assembled from an inner sleeve 30 and an outer sleeve 31. The cooling attachment 3, however, can also be designed in one piece.

The functional principle of the device just described is explained below.

The cooling attachment 3 is mounted on the shrink-fit chuck being cooled, so that the cooling attachment 3 sits with its bottom 20 on the shrink-fit chuck or on a holding device for the shrink-fit chuck. Uncontrolled suction of outside air and noise development connected therewith can thereby be avoided. This sealed arrangement is supported by the additional sealing element 22. Air is then drawn in via the suction unit to the intake part 10 and guided by the feed line 11 between the intake tube 4 and the upper housing part 9 as well as the additional feed line 12 between the cooling attachment 3 and the lower housing part 8 downward to the input 7 on the passage opening 6 of the cooling attachment 3. From there the cooling air is then guided upwardly through the gap between the passage opening 6 of the cooling attachment 3 and the outside of the shrink-fit chuck, as well as the intake tube 4. The coolant additionally supplied via feed holes 25 is entrained by the upwardly directed air stream.

After conclusion of the cooling process, the supply of coolant is switched off in order to dry the shrink-fit chuck, especially when a liquid coolant is used, with the remaining air stream. Additional blast air can be introduced via the blast air openings 28 in order to blow off any liquid coolant still present.

A temperature sensor can be provided on the cooling attachment 3 to determine the temperature of the shrink-fit chuck. It can thereby be determined whether the shrink-fit chuck is still too hot. The determined value can be displayed via a light system on the cooling attachment 3 (red=too hot to be touched; green=sufficiently cooled). As an alternative or in addition to the visual display, the cooling attachment 3 can also be interlocked at high temperature, so that premature raising of the cooling attachment 3 is impossible. The temperature sensor preferably measures the temperature of the outflowing air stream after the cooling area. However, alternatively, it is also possible to directly measure the temperature of the shrink-fit chuck, for example, in contactless fashion by infrared measurement of heat radiation or by a contact sensor.

Figure 4:
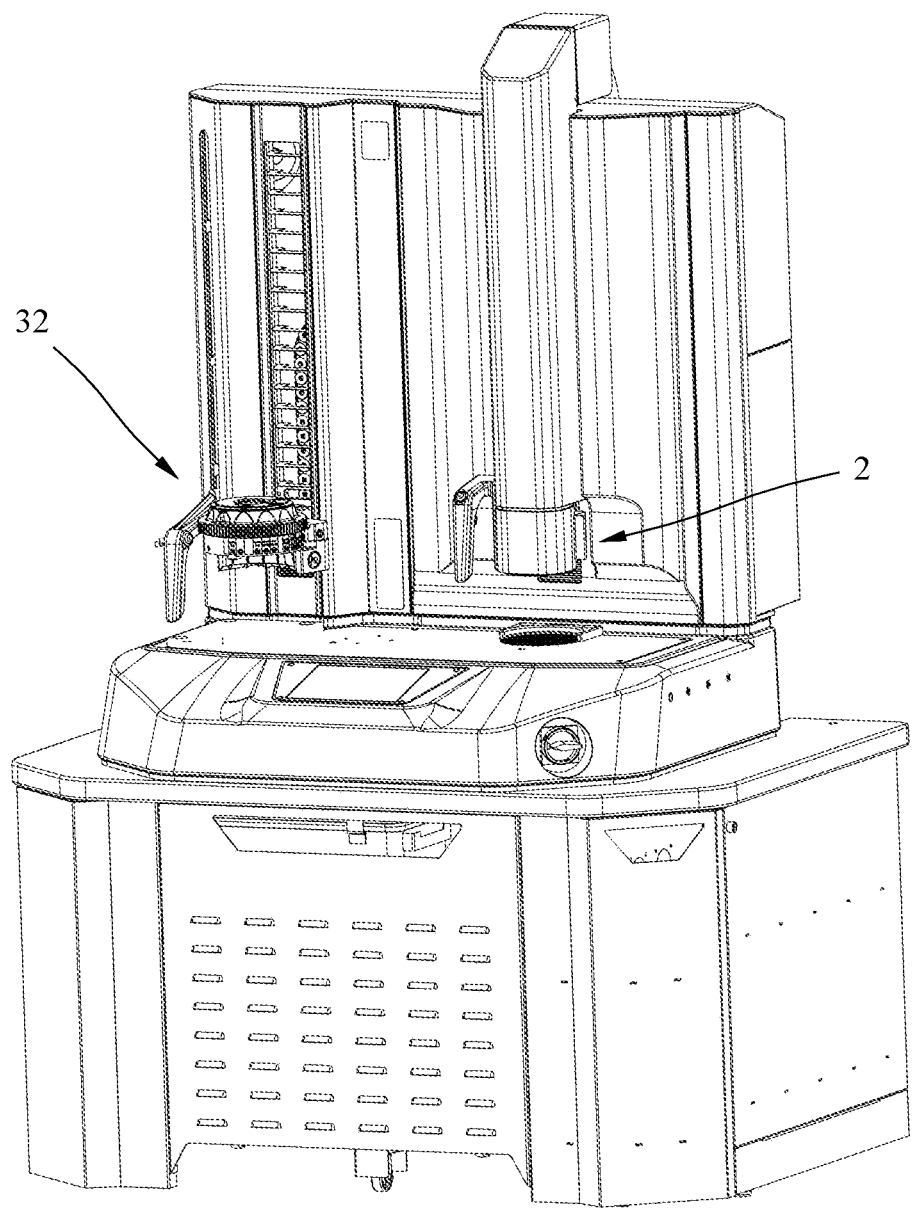
FIG. 4 shows a shrinkage device in a perspective view.

The cooling device can theoretically be operated as a separate element but is preferably part of the full shrinkage device depicted schematically in FIG. 4. In this shrinkage device, in addition to the cooling head 2, a shrinkage device 32 for shrinking-in or shrinking-out of the tool can be arranged. However, an induction device can also be integrated in the cooling attachment. The cooling attachment can therefore be used not only for cooling, but also for shrinking-in or shrinking-out of the tool.

LIST OF REFERENCES NUMBERS

1 Stand
2 Cooling head
3 Cooling attachment
4 Intake tube
5 Intake line
6 Passage opening
7 Input
8 Lower housing part
9 Upper housing part
10 Intake part
11 Feed line
12 Additional feed line
13 Passage
14 Grid tube
15 Lower spacer
16 Upper spacer
17 Annular space
18 Insulating element
19 Opening
20 Bottom
21 Radial collar
22 Sealing element
23 Sealing lip
24 Feed line
25 Feed hole
26 Connection
27 Feed line
28 Blast air opening
29 Connection
30 Inner sleeve
31 Outer sleeve
32 Shrinkage device

The invention claimed is:

1. A cooling device for cooling a shrink-fit chuck, the cooling device comprising:
a cooling head having a cooling air feed;
a cooling attachment configured and arranged for mounting on at least a part of the shrink-fit chuck; and
an intake tube connected to the cooling attachment, the intake tube configured and arranged for intake of air at an input of a passage opening in the cooling attachment;
wherein the cooling device further includes a sound insulation device configured and arranged to surround the intake tube at least partially insulate the cooling air feed to dampen sound resulting from the cooling air feed supplying air to the input of the passage opening;
wherein the cooling air feed has two feed lines for air flow in a flow direction, the two feed lines including a first feed line and a second feed line connected to the first feed line, the second feed line configured and arranged downstream the first feed line such that air flows through the first and second feed lines in the same flow direction which is opposite to the direction of flow in the intake tube.

2. The cooling device according to claim 1, wherein an inner contour of the passage opening in the cooling attachment is adjusted to an outside contour of a part of the shrink-fit chuck to be cooled such that when the cooling attachment is mounted on the shrink-fit chuck a gap remains between an interior wall of the cooling attachment and an exterior surface of the shrink-fit chuck.

3. The cooling device according to claim 2, further comprising a device for supplying coolant arranged on the cooling attachment, the device for supplying coolant configured for supplying coolant into the gap between the interior wall of the cooling attachment and the exterior surface of the shrink-fit chuck.

4. The cooling device according to claim 3, wherein the coolant is a liquid coolant or a gaseous coolant.

5. The cooling device according to claim 3, wherein the device for supplying coolant includes a feed line arranged in the cooling attachment.

6. The cooling device according to claim 5, wherein the feed line of the device for supplying coolant includes a plurality of feed holes configured and arranged for discharging into the passage opening in the cooling attachment.

7. The cooling device according to claim 6, wherein each feed hole of the plurality of feed holes runs obliquely downwards in a direction of input into the passage opening in the cooling attachment.

8. The cooling device according to claim 1, wherein the cooling attachment includes an inner sleeve and an outer sleeve.

9. The cooling device according to claim 1, further comprising a housing, the housing enclosing the cooling attachment and the intake tube.

10. The cooling device according to claim 9, wherein the first feed line is arranged between the housing and the intake tube and the second feed line is arranged between the housing and the cooling attachment.

11. The cooling device according to claim 9, wherein the sound insulation device includes a perforated tube arranged concentrically around the intake tube within the housing.

12. The cooling device according to claim 11, wherein the first feed line runs through the perforated tube.

13. The cooling device according to claim 11, wherein the perforated tube is spaced apart from the intake tube and secured to the housing by an upper spacer and a lower spacer.

14. The cooling device according to claim 11, wherein the sound insulation device further includes an insulating element arranged between the perforated tube and the housing.

15. The cooling device according to claim 14, wherein the insulating element is glass wool.

16. The cooling device according to claim 9, further including an inwardly protruding radial collar positioned opposite the passage opening in the cooling attachment, the inwardly protruding radial collar arranged at an opening in a bottom of the housing and spaced apart from an end surface of the cooling attachment.

17. The cooling device according to claim 9, further including a sealing element for contact with the shrink-fit chuck positioned opposite the passage opening in the cooling attachment, the sealing element having a flexible, inwardly protruding sealing lip arranged at an opening in a bottom of the housing and spaced apart from an end surface of the cooling attachment.

18. The cooling device according to claim 1, further comprising a plurality of blast air openings arranged in the cooling attachment.

19. The cooling device according to claim 18, wherein each blast air opening of the plurality of blast air openings is directed obliquely upwards.

* * * * *